US010435135B2

(12) United States Patent
Janeke

(10) Patent No.: US 10,435,135 B2
(45) Date of Patent: Oct. 8, 2019

(54) SYSTEM, APPARATUS AND METHODS FOR HYPERSONIC SHOCKWAVE MUFFLER

(71) Applicant: Charl E. Janeke, Los Angeles, OR (US)

(72) Inventor: Charl E. Janeke, Los Angeles, OR (US)

(*) Notice: Subject to any disclaimer, the term of this patent is extended or adjusted under 35 U.S.C. 154(b) by 316 days.

(21) Appl. No.: 15/256,455

(22) Filed: Sep. 2, 2016

(65) Prior Publication Data
US 2017/0057614 A1 Mar. 2, 2017

Related U.S. Application Data

(60) Provisional application No. 62/213,525, filed on Sep. 2, 2015.

(51) Int. Cl.
B64C 1/38 (2006.01)
B64C 23/04 (2006.01)
B64C 30/00 (2006.01)
B64C 1/00 (2006.01)
B64D 27/02 (2006.01)

(52) U.S. Cl.
CPC .............. B64C 1/38 (2013.01); B64C 1/0009 (2013.01); B64C 23/04 (2013.01); B64C 30/00 (2013.01); B64D 27/023 (2013.01); B64C 2001/0045 (2013.01)

(58) Field of Classification Search
CPC ......... B64C 1/38; B64C 1/0009; B64C 23/04; B64C 30/00; B64C 2001/0045; B64C 2230/30; B64C 2230/24; B64G 1/002
See application file for complete search history.

(56) References Cited

U.S. PATENT DOCUMENTS

| 2,709,446 | A |   | 9/1969 | Espy et al. |
| 3,620,484 | A |   | 11/1971 | Scoppe |
| 3,713,607 | A | * | 1/1973 | Hill ........................ F42B 10/46 244/3.1 |
| 4,817,892 | A |   | 4/1989 | Janeke |
| 4,917,335 | A |   | 4/1990 | Tidman |
| 5,191,761 | A |   | 3/1993 | Janeke |
| 6,213,431 | B1 |   | 4/2001 | Janeke |
| 6,648,275 | B2 |   | 11/2003 | Janeke |
| 6,974,111 | B2 |   | 12/2005 | Janeke |
| 7,344,111 | B2 |   | 3/2008 | Janeke |
| 7,648,100 | B2 | * | 1/2010 | Kremeyer ............... B64C 23/04 244/1 R |
| 7,690,601 | B2 |   | 4/2010 | Janeke |
| 8,079,544 | B2 | * | 12/2011 | Kremeyer ............... B64C 23/04 244/1 R |
| 8,141,811 | B2 | * | 3/2012 | Kremeyer ............. B64C 23/005 244/1 N |
| 8,215,589 | B2 |   | 7/2012 | Janeke |

(Continued)

Primary Examiner — Philip J Bonzell
(74) Attorney, Agent, or Firm — J. Curtis Edmondson

(57) ABSTRACT

An apparatus and method that improves the operation of aerospace planes or rockets having an integrated flute and hat components whereby the flute functions as a hypersonic refrigeration engine and the hat as a flat plate heat exchanger to achieve an isothermal compression of the incipient hypersonic air in front of the nosecone to reduce hypersonic vibrations during flight, these improvements allow for the reduction in temperature during flight operation allowing for improved cooling of the aerospace plane or rocket.

5 Claims, 10 Drawing Sheets

(56) References Cited

U.S. PATENT DOCUMENTS

| | | |
|---|---|---|
| 8,505,852 B2 | 8/2013 | Janeke |
| 8,511,612 B2 * | 8/2013 | Kremeyer ............. B64C 23/005 244/130 |
| 8,534,595 B2 * | 9/2013 | Kremeyer ............... B64C 23/04 244/1 R |
| 9,193,457 B2 | 11/2015 | Janeke |
| 9,297,625 B2 | 3/2016 | Janeke |
| 9,555,876 B2 * | 1/2017 | Kremeyer ............... B64C 23/04 |
| 2008/0001030 A1 * | 1/2008 | Kobayashi ............. B64C 23/04 244/99.12 |
| 2013/0299002 A1 * | 11/2013 | Kremeyer ............. B64C 23/005 137/13 |
| 2016/0114879 A1 | 6/2016 | Janeke |
| 2016/0362176 A1 * | 12/2016 | Kremeyer ............. B64C 23/005 |
| 2017/0313413 A1 * | 11/2017 | Kremeyer ............... B64C 23/04 |
| 2018/0170525 A1 * | 6/2018 | Kremeyer ............... B64C 23/04 |

* cited by examiner

SYSTEM, APPARATUS AND METHODS FOR HYPERSONIC SHOCKWAVE MUFFLER

CROSS REFERENCE TO RELATED APPLICATIONS

This application claims the benefit of U.S. Provisional Patent Application No. 62/213,525 filed Sep. 2, 2015, which is incorporated herein by reference in its entirety.

FIELD

The field for this inventive subject matter is about a device to improve high speed air travel in general, and in particular, for aerospace planes or rocket ships.

BACKGROUND

One problem of hypersonic travel are shockwaves. Shockwaves can generate extreme vibrations on planes and rockets during operation. For example, the Concorde, that travelled at hypersonic speeds, was grounded due to problems with shockwaves. Likewise, the hypersonic XR70 was extremely difficult to operate as a result of shockwaves. At higher speeds, it is likely that aircraft and rockets will be subjected shockwaves and the resultant vibration harmonics that affect structural integrity and aerodynamic stability.

Different approaches have been taken to reduce vibrations generated by shockwaves during supersonic travel. U.S. Pat. No. 3,709,446 issued to Epsy describes the generation of an expansion wave of an intensity and at a position whereby the surface contacting portion of the vehicle's shock wave is blended with and reduced by portions of the expansion wave. U.S. Pat. No. 4,917,335 issued to Tidman describes about lowering the atmospheric mass density immediately forward of a moving body by a fine high speed stream or jet of a material containing a chemically interactive component being ejected forwardly of such a body moving at high speed with respect to the atmosphere. U.S. Pat. No. 3,620,484 issued to Schoppe describes about a nose of the moving body being provided with blunt configuration at its leading portion to create a detached normal shock wave.

There yet exists a need for an non chemical approach to reduce the vibration generated by shockwaves by heat exchange concept which would enable external isothermal compression of the external airstream on contact.

SUMMARY

The present inventive subject matter describes a supersonic isothermal compression refrigeration engine coupled to a conical triangular hat i.e. isothermal heat exchanger dome. By compressing; spinning; expanding; flashing the supersonic air stream at high altitude, a chilled vortex is generated that will isothermally chill the shock-front isothermally on the outside of the dome. The reason for isothermal compression is that the supersonic boundary layer in contact with the shell is continuously chilled by the cold air stream on the inside and the work of harmonic isothermal compression is only a fraction of chaotic adiabatic shockwave compression.

In one of the embodiment an aerospace plane comprising of a conductive funneled nosecone which is in the shape of a diverging flute is described. A hypersonic vortex choke is incorporated into the nosecone intake, whereby the diverging section of the flute functions as a Joule-Thomson throttling tube. The hat section of the flute functions as a heat exchanger, whereby the rim of the outlet aperture is serrated to generate vortices.

In another embodiment an aerospace plane with slotted/blotted leading-edge wings is described, whereby the leading edge comprise micro-scaled drag reduction slots, which may be double duplex layered and may be cryogenically chilled. The slots may be continuous/stepped/oval/circular and also equipped with primary and secondary vortex generating wedges.

In yet another embodiment an aerospace plane with clam-shelled wing apertures is described, whereby the clamshell aperture houses a turbojet power plant to facilitate takeoff, transonic acceleration and return-to-base power.

These and other embodiments are described in more detail in the following detailed descriptions and the figures. The foregoing is not intended to be an exhaustive list of embodiments and features of the present inventive subject matter. Persons skilled in the art are capable of appreciating other embodiments and features from the following detailed description in conjunction with the drawings.

DETAILED DESCRIPTION

In the following description, numerous specific details are set forth such as examples of specific materials, methods, components, etc. in order to provide a thorough understanding of the present inventive subject matter. It will be apparent, however, to one skilled in the art that these specific details need not be employed to practice the present invention. In other instances, well-known materials or methods have not been described in detail in order to avoid unnecessarily obscuring the present inventive subject matter.

The present inventive subject matter describes a method and apparatus for a hypersonic shockwave muffler.

Figure 1:
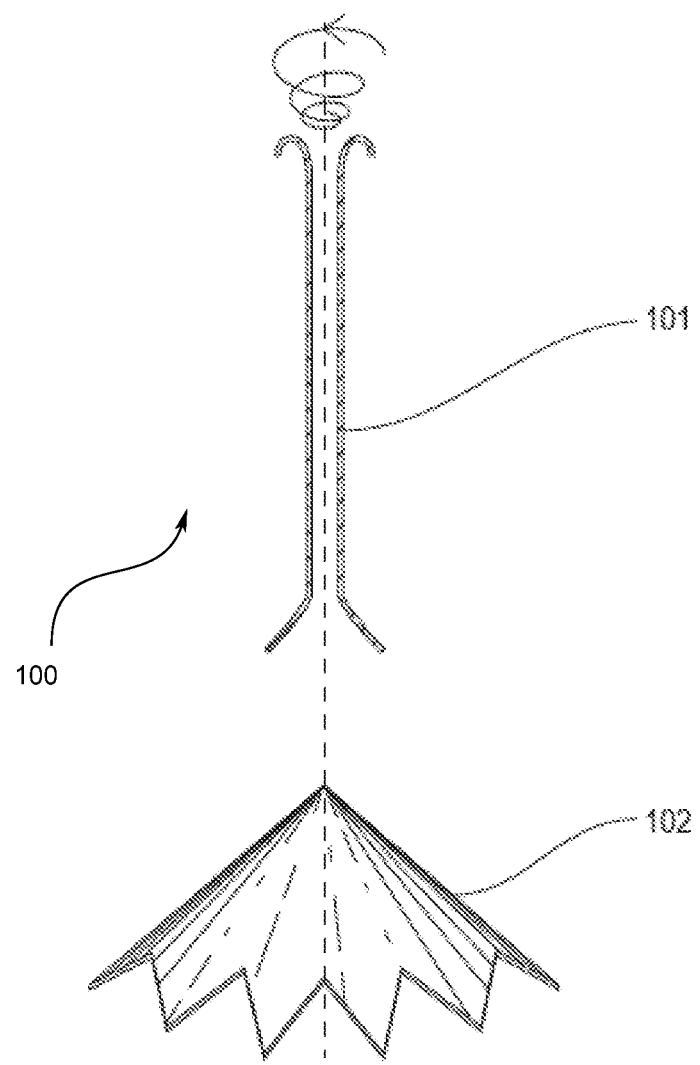
FIG. 1 illustrates an elemental flute and hat.

As shown in FIG. 1, 100 represents an expanded representation of a thermally conductive elemental flute 101 and hat 102. The elemental flute 101 is typically a tube-like structure that is placed in front of the aerospace plane or rocket. The hat 102, is usually a flange-like structure that is mounted on one end of the elemental flute 101 and attached to the nosecone.

During operation of the rocket at hypersonic speeds, the ambient air stream enters the elemental flute 101 The air then spins as a vortex down the tube, then expands across the nosecone and is constrained by the hat 102. This results in the cooling of the incoming air.

The elemental flute 101 and the hat 102 may be constructed using any type of thermally conductive material with sufficient strength to operate at hypersonic speeds. Typical materials are thermally conductive copper, aluminum, silver but other materials and/or composite metal alloys may also be used. The specific structural and material configurations of flute and hat are exemplary only. Other similar design configurations may be used that generally fall within the spirit and scope of the present disclosure.

Figure 2:
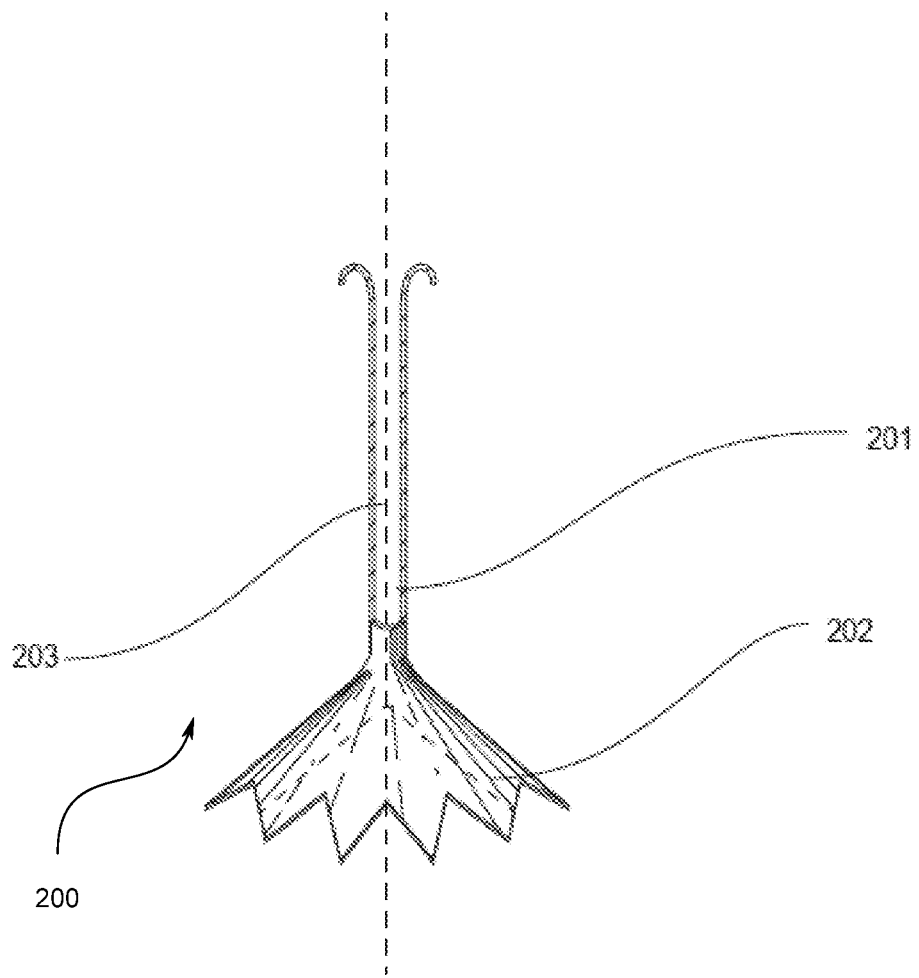
FIG. 2 illustrates the integration of an elemental flute on to a hat.

Referring to FIG. 2, 200 illustrates the integrated elemental flute and hat 203 comprising of a flute portion 201 and a hat portion 202. The integrated elemental flute and hat 203 functions as a plate heat exchanger which enables isothermal compression of the external airstream on contact via cooling/chilling the heat of compression at formation.

Figure 3:
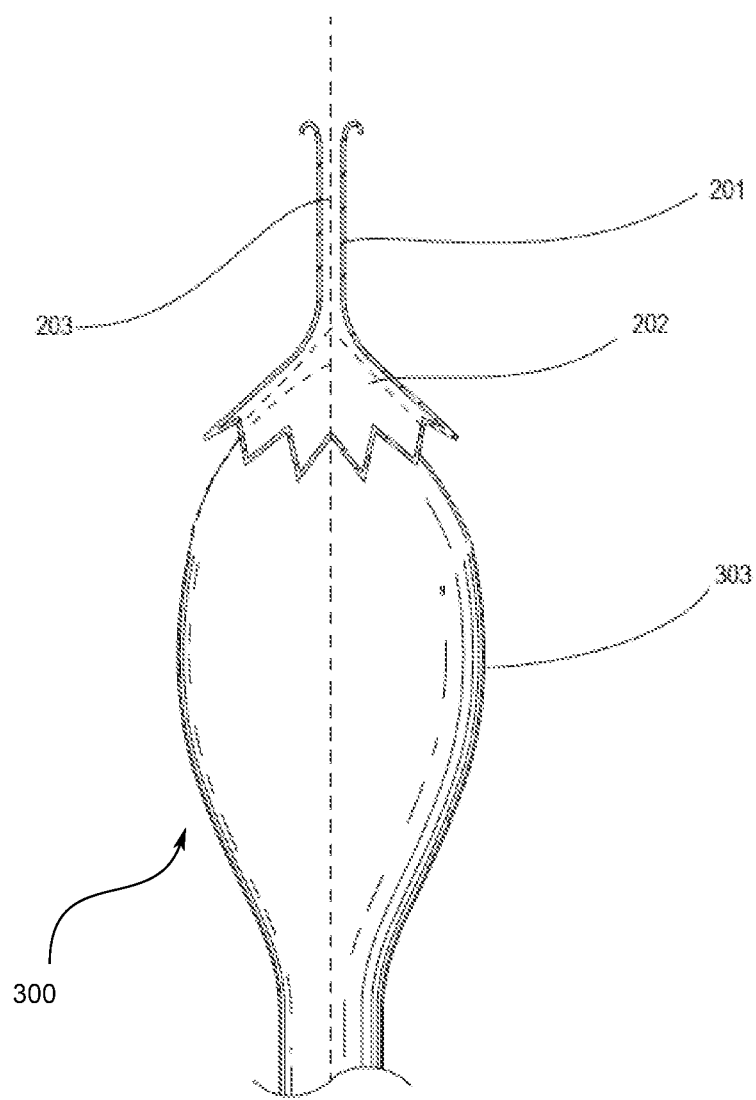
FIG. 3 illustrates the integration of an elemental flute, hat on the nosecone.

Now referring to FIG. 3, 300 represents integrated flute and hat 203 as placed proximate to a nosecone 303. This combination functions as a heat exchanger which enable supersonic isothermal compression of the external airstream on contact via a cooling/chilling the heat of compression at formation around the nosecone.

Figure 4:
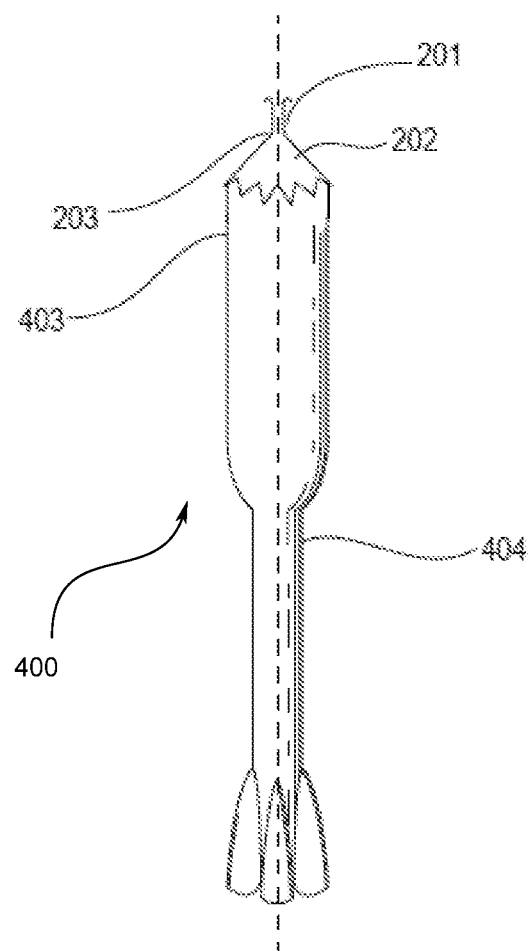
FIG. 4 illustrates the integration of an elemental flute, hat, nosecone in conjunction with the rocket.

Reviewing FIG. 4, 400 represents the integrated flute and hat 203 as connected to a rocket nosecone 403, on an air-breathing rocket 404 functioning as a plate heat exchanger enabling isothermal compression of the external airstream at supersonic speeds. This cooling/chilling is caused by the expansion of the airstream at the nosecone.

Figure 5:
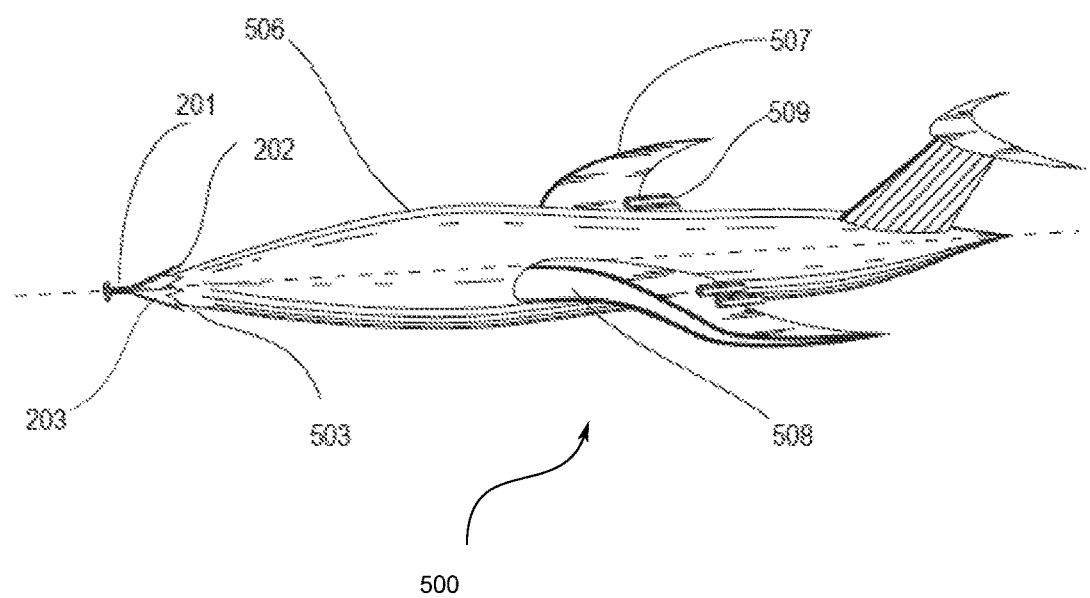
FIG. 5 illustrates the integration of an elemental flute, hat and the nosecone onto an aerospace plane.

Referring to FIG. 5, 500 represents the integrated flute and hat 203 as connected to the aerospace plane nosecone 503 on an air-breathing hypersonic aerospace plane 506 with wings 507, intakes 508 and propulsion engines 509. As the aerospace plane travels at supersonic speed, the integrated flute and hate 203 functions as a plate heat exchanger enabling isothermal compression around the aerospace plane nosecone 503.

Figure 6:
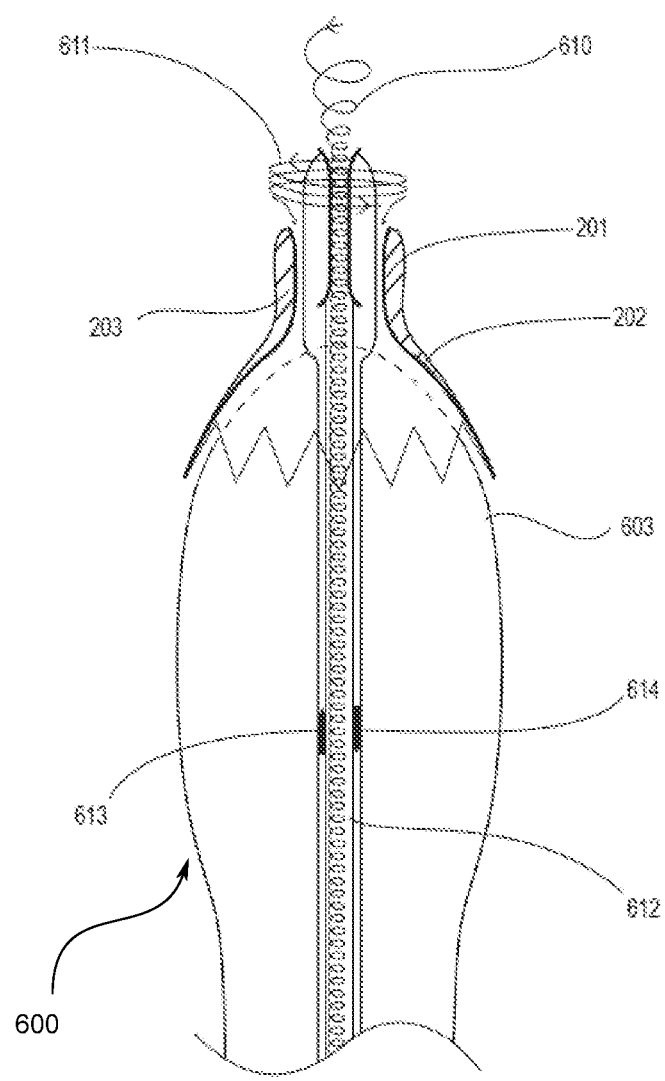
FIG. 6 illustrates an integration of an elemental flute with a hybrid rocket nosecone.
Figure 7:
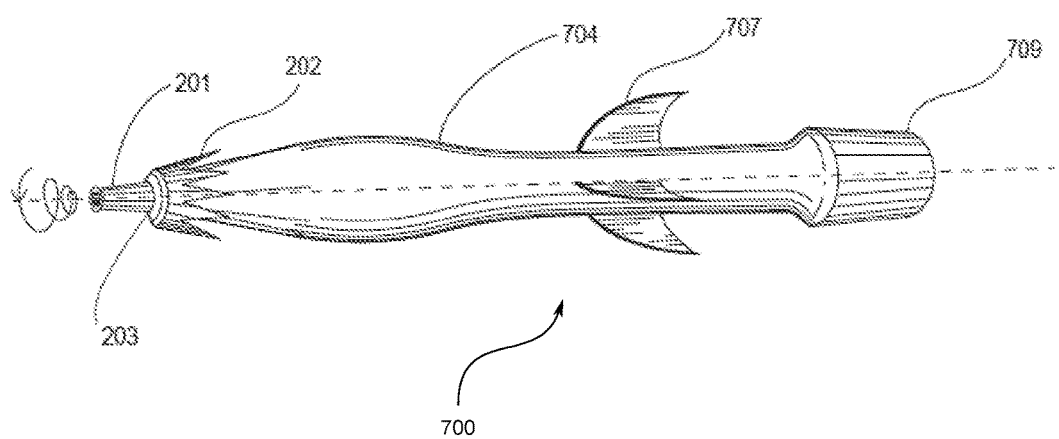
FIG. 7 illustrates integration of an elemental flute with a hybrid rocket nosecone.

Referring to FIG. 6 and FIG. 7. FIG. 6 is a close-up top view 600 of the front part of the hybrid rocket with an internal shaft 612. Illustrated in FIG. 6 is an integrated flute and hat 203 mounted on a frustum shaped nosecone 603, the frustrum shaped nosecone has a shaft 612 that runs the length of the hybrid rocket with 613 and 614 representing the cryogenic conduits. The air entering through the shaft air intake 610 becomes a vortex which is funneled via shaft 612. Now referring to FIG. 7, the airstream 610 runs the length of the hybrid rocket to an air-breathing hybrid propulsion rocket engine 709 as shown in FIG. 7. 700 illustrates the integrated flute and nosecone 203, integrated onto an air-breathing hybrid rocket 704 with fins 707 and an air-breathing hybrid propulsion rocket 709.

In a preferred embodiment, the integrated flute and hat 203 is configured on a rocket or airplane such that two-thirds of the length of the integrated flute and hat is placed on the airplane/rocket/or a nosecone and one-third of its length is in front of the nosecone to bring about the isothermal compression of the air in front of nosecone. The flare design of the hat mitigates the length of the choke.

Figure 8:
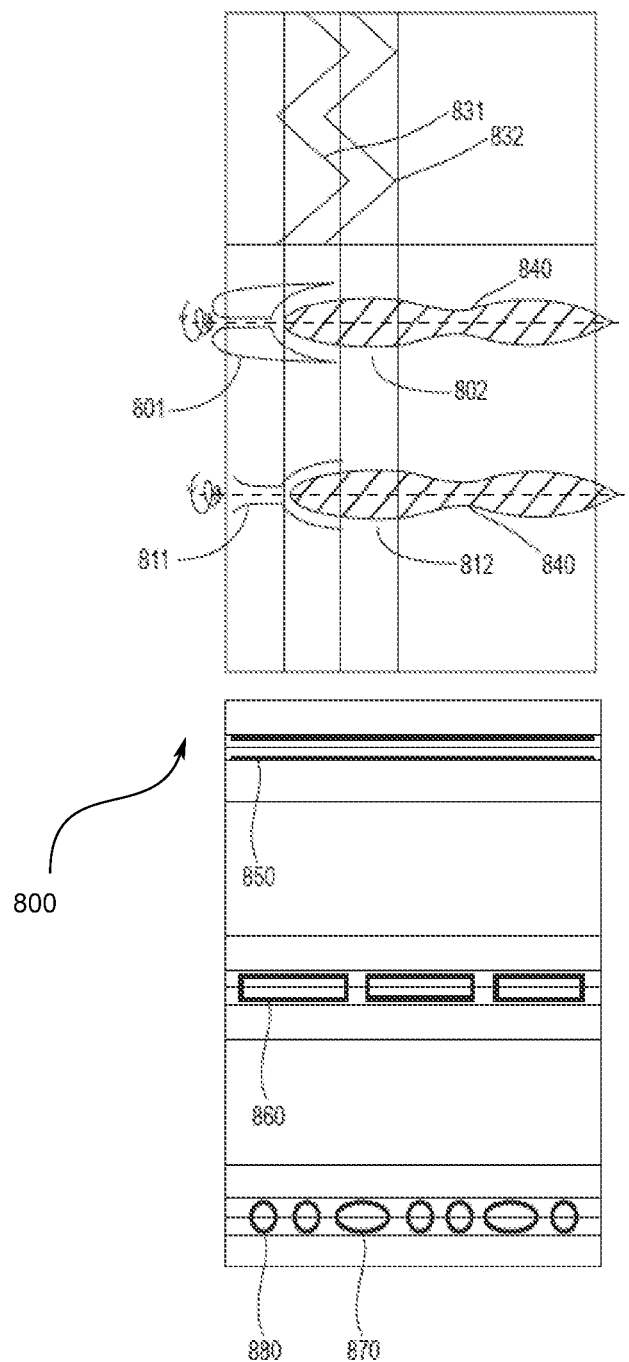
FIG. 8 illustrates the makeup of a supercritical shockwave piercing hypersonic wing with the slotted elemental flute.

Referring to FIG. 8, 800 which illustrates the elements of a (fluted) supercritical shockwave piercing hypersonic wing whereby flutes 801/811 and 850/860/807/880 (which may be continuous slotted, stepped, oval and/or rounded) functions as micro-scaled shockwave abatement Busemann biplane wings with the refractive shock front expanding linearly within hat section 812 over vortex wedges 831/832 and supercritical area ruled chord 840 in accordance with the isothermal chilling protocol FIG. 400.

Figure 9:
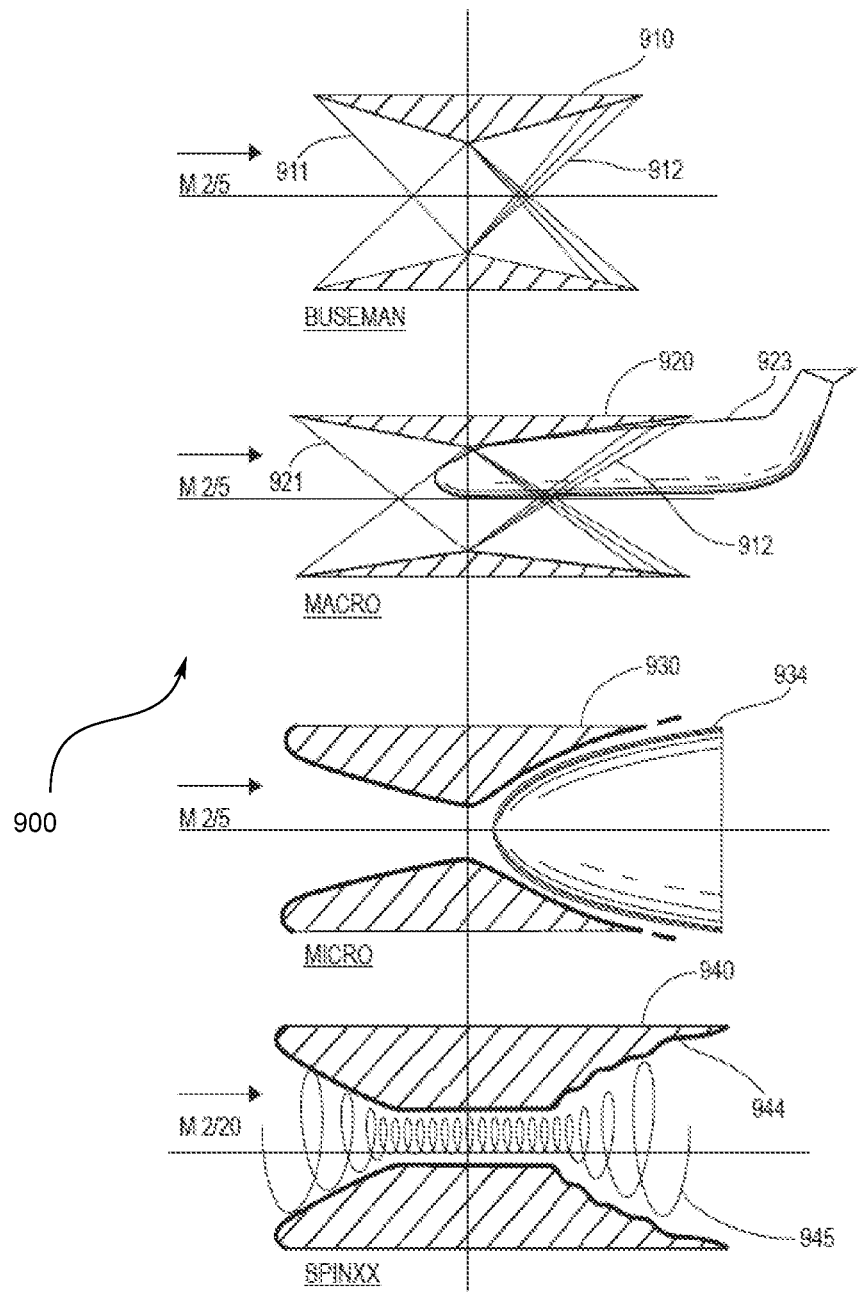
FIG. 9 illustrates the biplane shockwave.

Referring to FIG. 9, 900 which illustrates the transformation of the legacy Busemann ("biplane") shockwave abatement postulation whereby leading shockwaves 911 generated refractive shockwaves 912 as (1) macro-scaled Busemann supersonic Mach 2/5 airliner with leading/refractive shockwaves 921/922, supersonic Busemann biplane wings 920 and (supersonic) airframe 923 (2) a micro-scaled Busemann supersonic shockwave abatement leading edge slots 930/934 and (3) regenerative cryogenically chilled M2/20 SPINNX hypersonic vortex choke 940/944/945.

Figure 10:
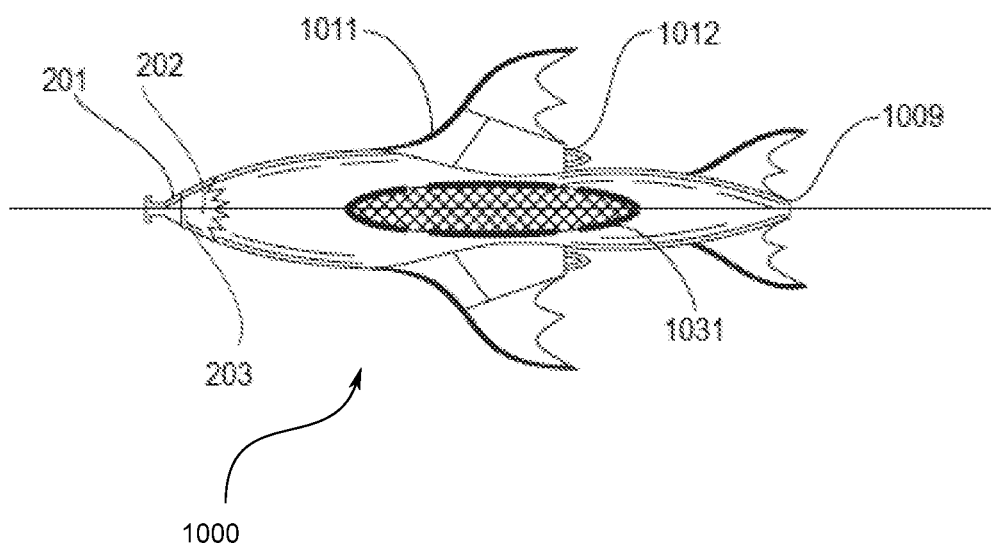
FIG. 10 illustrates an articulated clamshell turbojet.

Referring to FIG. 10, 1000 which illustrates an alternate embodiment of FIG. 5. The articulated clamshell Busemann turbojet air intake aperture 1011 housing turbojet 1012 that may be opened/closed in accordance with the Mach domain that may be (1) applied for takeoff and transonic acceleration power and (2) supply bleed air to drive combustion of the primary hybrid propulsion unit 20013 at takeoff. Pointer 1001 illustrates the fluted Busemann derivative hypersonic shockwave muffler, 1009 illustrates the primary air-breathing propulsion unit and pointer 1031 an ancillary/piggy-back orbital incretion payload.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

The invention claimed is:

1. A rocket capable of hypersonic travel comprising:
   an integrated flute and hat proximately mounted on to a nosecone of the rocket; and
   the integrated flute and hat comprising a first open end and a second open end, the first open end having a first flare structure and the second open end having a second flare structure with a serrated edge.

2. The rocket as described in claim 1, wherein the integrated flute and hat bring about an isothermal compression of an airstream in front of the nosecone of the rocket.

3. The rocket as described in claim 1, wherein the integrated flute and hat is made up of material chosen from a group consisting of aluminum, copper, silver or composites.

4. The rocket as described in claim 1, wherein the integrated flute and hat is positioned such that two-third of the length of the integrated flute and hat is placed on the nosecone and one-third placed in front of the nosecone.

5. The rocket as described in claim 1, wherein the shape of the flute can be chosen from a group consisting of continuous, slotted, oval or rounded.

* * * * *